(12) United States Patent
Harger et al.

(10) Patent No.: US 11,480,335 B2
(45) Date of Patent: Oct. 25, 2022

(54) PORTABLE IGNITION CONTROLLER

(71) Applicant: Harger, Inc., Grayslake, IL (US)

(72) Inventors: Mark S. Harger, Bristol, WI (US); William Steve Marcomb, Antioch, IL (US)

(73) Assignee: HARGER, INC., Grayslake, IL (US)

( * ) Notice: Subject to any disclaimer, the term of this patent is extended or adjusted under 35 U.S.C. 154(b) by 0 days.

(21) Appl. No.: 16/899,117

(22) Filed: Jun. 11, 2020

(65) Prior Publication Data

US 2020/0370751 A1    Nov. 26, 2020

Related U.S. Application Data

(63) Continuation of application No. 15/389,110, filed on Dec. 22, 2016, now Pat. No. 10,684,012, which is a continuation of application No. 14/170,209, filed on Jan. 31, 2014, now Pat. No. 9,562,751.

(51) Int. Cl.
| | |
|---|---|
| *F23Q 7/00* | (2006.01) |
| *F23Q 7/16* | (2006.01) |
| *F42B 3/10* | (2006.01) |
| *F24V 30/00* | (2018.01) |
| *H02J 7/00* | (2006.01) |

(52) U.S. Cl.
CPC ............... *F23Q 7/16* (2013.01); *F24V 30/00* (2018.05); *F42B 3/10* (2013.01); *H02J 7/0047* (2013.01)

(58) Field of Classification Search
CPC .... F23Q 7/16; F42B 3/10; F24V 30/00; H02J 7/0047

USPC ......................................................... 361/264
See application file for complete search history.

(56) References Cited

U.S. PATENT DOCUMENTS

| | | | |
|---|---|---|---|
| 4,062,485 A | 12/1977 | Andersen | |
| 4,131,413 A | 12/1978 | Ryno | |
| 4,889,324 A | 12/1989 | Brosnan et al. | |
| 5,145,106 A | 9/1992 | Moore et al. | |
| 5,660,317 A | 8/1997 | Singer et al. | |
| 5,975,888 A | 11/1999 | Hsu | |

(Continued)

FOREIGN PATENT DOCUMENTS

| | | |
|---|---|---|
| EP | 0875330 A1 | 11/1998 |
| EP | 1472037 B1 | 1/2009 |

(Continued)

OTHER PUBLICATIONS

United States Patent Office Action for U.S. Appl. No. 14/170,209 dated Apr. 22, 2016 (7 pages).

(Continued)

*Primary Examiner* — Jared Fureman
*Assistant Examiner* — Lucy M Thomas
(74) *Attorney, Agent, or Firm* — Michael Best & Friedrich LLP (57) ABSTRACT

A portable exothermic welding ignition controller includes a housing configured to receive a first portion of a portable power tool battery with a second portion of the portable tool battery external to the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board.

36 Claims, 4 Drawing Sheets

(56) References Cited

U.S. PATENT DOCUMENTS

| | | |
|---|---|---|
| 6,575,735 B1 | 6/2003 | Lloveras Capilla |
| 6,789,724 B2 | 9/2004 | Cordier et al. |
| 6,793,003 B2 | 9/2004 | Triantopoulos et al. |
| 6,994,244 B2 | 2/2006 | Harger et al. |
| 7,240,717 B2 | 7/2007 | Lofton |
| D623,126 S | 9/2010 | Contreras |
| 7,946,466 B1 | 5/2011 | Lofton |
| 7,950,568 B2 | 5/2011 | Stidham et al. |
| 7,975,900 B2 | 7/2011 | Lofton et al. |
| 8,074,864 B2 | 12/2011 | Lofton et al. |
| 8,292,457 B2 | 10/2012 | Schenk et al. |
| 9,115,890 B2 | 8/2015 | Zagoroff |
| 9,419,258 B2 * | 8/2016 | Pickens ................ A45F 5/021 |
| 2003/0022120 A1 | 1/2003 | Liang |
| 2008/0251559 A1 | 10/2008 | Uejima et al. |
| 2009/0188969 A1 | 7/2009 | Siracki et al. |
| 2010/0063757 A1 * | 3/2010 | Suzuki .................... H02J 7/00 702/63 |
| 2010/0163607 A1 | 7/2010 | Viseur et al. |
| 2011/0132967 A1 | 6/2011 | Lofton et al. |
| 2011/0198391 A1 | 8/2011 | Stidham et al. |
| 2012/0055979 A1 | 3/2012 | Alghusain |
| 2015/0328716 A1 | 11/2015 | Duart Alvarez Cienfuegos |
| 2016/0115933 A1 * | 4/2016 | Koenen .................. B60T 7/042 290/38 R |

FOREIGN PATENT DOCUMENTS

| | | |
|---|---|---|
| WO | 2007014191 A2 | 2/2007 |
| WO | 2011071561 A1 | 6/2011 |

OTHER PUBLICATIONS

United States Patent Office Notice of Allowance for U.S. Appl. No. 14/170,209 dated Sep. 27, 2016 (7 pages).

* cited by examiner

PORTABLE IGNITION CONTROLLER

CROSS-REFERENCE TO RELATED APPLICATIONS

This application is a continuation of U.S. patent application Ser. No. 15/389,110, filed Dec. 22, 2016, and soon to issue as U.S. Pat. No. 10,684,012, which in turn is a continuation of U.S. patent application Ser. No. 14/170,209, filed Jan. 31, 2014, and issued as U.S. Pat. No. 9,562,751, the contents of which are incorporated herein by reference.

BACKGROUND

The present invention relates to an ignition controller, and more specifically to an exothermic welding ignition controller.

SUMMARY

In one embodiment, a portable exothermic welding ignition controller includes a housing configured to receive a portion of a portable power tool battery. A circuit board is positioned within the housing and configured for electrical coupling to the portable power tool battery. An actuator is operatively engageable with the circuit board for selectively discharging power from the portable power tool battery to a connection terminal electrically coupled to the circuit board.

In one embodiment, a method for discharging power from a portable power tool battery to an exothermic welding device includes electrically coupling the portable power tool battery to a circuit board operatively engaged with an actuator. The method also includes connecting the exothermic welding device to a terminal electrically coupled to the circuit board. The method further includes actuating the actuator to establish electrical communication between the portable power tool battery and the terminal, whereby power is discharged from the portable power tool battery to the exothermic welding device In one embodiment, a method for discharging power from a portable power tool battery to a filament of an exothermic welding igniter includes electrically coupling the portable power tool battery to a circuit board operatively engaged with a manual actuator in the form of a plurality of pushbuttons. The method also includes connecting the igniter through a conducting wire to a terminal electrically coupled to the circuit board. The method further includes actuating the actuator to establish electrical communication between the portable power tool battery and the igniter, whereby power is discharged from the portable power tool battery to the igniter to heat the filament.

In one embodiment, a portable exothermic welding ignition controller includes a housing configured for electrical connection to a portable power tool battery. An external structure of the portable power tool battery is configured to support the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board.

In one embodiment, a portable exothermic welding ignition controller includes a housing configured to receive a first portion of a portable power tool battery with a second portion of the portable tool battery external to the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board In one embodiment, a portable exothermic welding ignition controller includes a housing configured to receive a portion of a portable power tool battery with a portion of the portable tool battery external to and configured to be supported on an exterior surface of the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The process of exothermic welding involves placing an amount of copper oxide powder into a mold base, securing the mold, and then igniting the copper oxide powder. The ignited powder is heated to a liquid state and drops into a lower chamber, forming an electrical connection around two adjacent grounding conductors as it cools. An ignition controller can be used to effect a voltage between a set of terminals in electrical communication with a filament positioned in physical contact with the copper oxide powder sufficient to heat the filament and ignite the powder.

Figure 1:
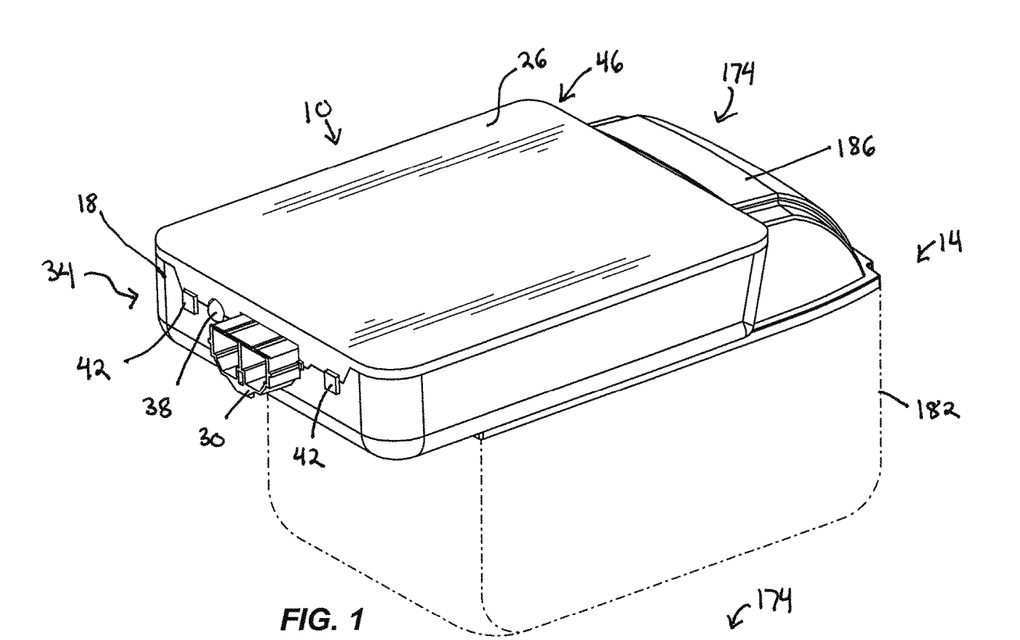
FIG. 1 is a perspective view of an ignition controller connected to a rechargeable battery pack.
Figure 2:
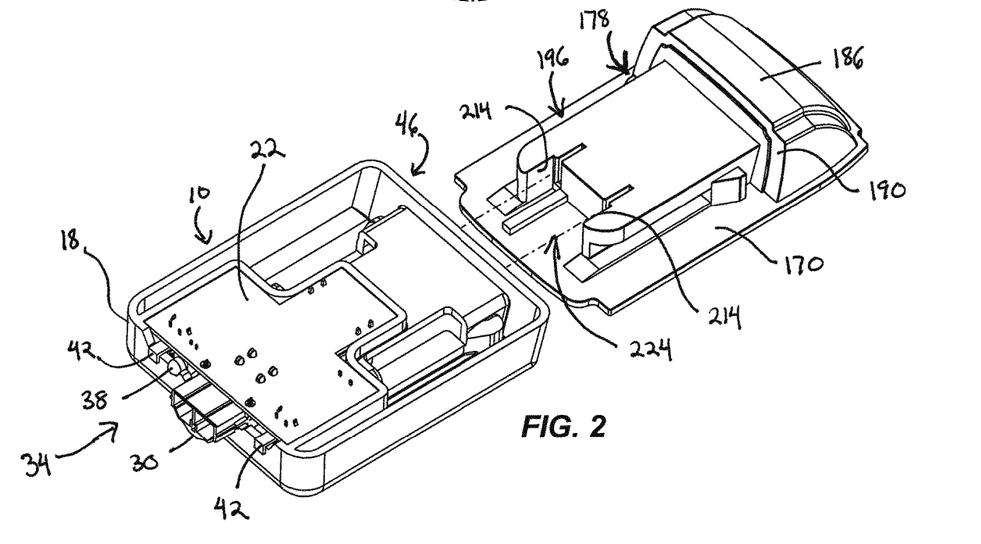
FIG. 2 is a perspective view of the ignition controller of FIG. 1 with a top cover removed and separated from the battery pack.

FIG. 1 illustrates an ignition controller 10 coupled to a battery pack 14. Referring also to FIG. 2, the ignition controller 10 includes a housing 18 containing a circuit board 22 onto which are connected certain electronic and electrical devices, for example, an electronic or electromechanical switch (not shown), coupled with other circuitry necessary for operation, as will be further described. A cover 26 protects the circuit board 22 from the surrounding environment. A seal, gasket, or other similar material (not shown) can be positioned between the cover 26 and the housing 18 to form a water-tight barrier therebetween. A connector 30 coupled to the circuit board 22 protrudes through an aperture formed between the housing 18 and the cover 26 on a first side 34 of the controller 10. The connector 30 can be a conventional male/female electrical connector. An LED (light-emitting diode) or other visual indicator 38 also coupled to the circuit board 22 extends from the first side 34, as do first and second actuators 42. The actuators 42 are in the form of pushbuttons operatively engageable with the aforementioned switch on the circuit board 22 but can alternatively be in any form sufficient to activate a switch or otherwise complete an electrical circuit.

Figure 3:
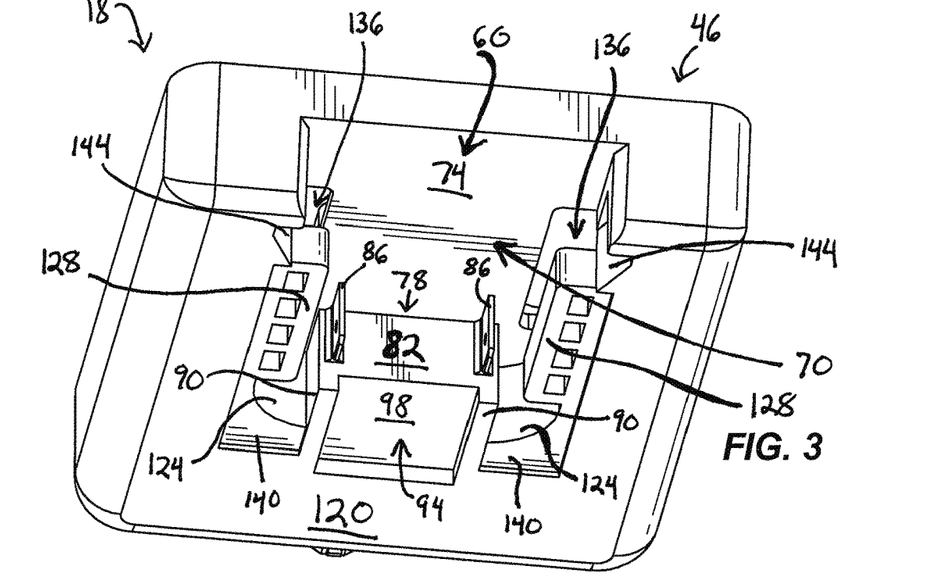
FIG. 3 is a perspective view of the opposing side of the ignition controller illustrated in FIG. 2.
Figure 4:
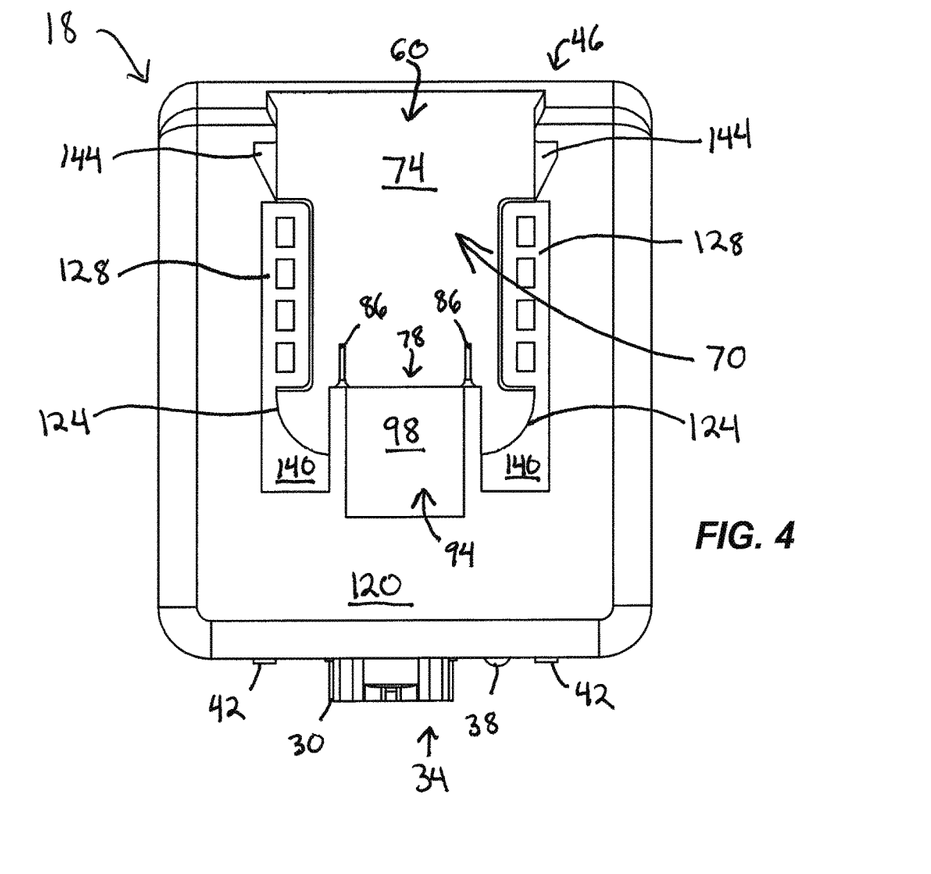
FIG. 4 is a plan view of the ignition controller illustrated in FIG. 3.

FIGS. 3 and 4 illustrate the coupling structure of the housing 18. An opening 60 on a second side 46 of the controller 10 leads to a recess 70 formed in the housing 18 for receiving a portion of the battery pack 14. The recess 70 is at least partially defined by a generally planar surface 74 and a connector block 78 having a contact surface 82, a pair of electrical prongs 86, and opposing side walls 90. A slight depression 94 in the connector block 78 forms a surface 98 offset from the external housing surface 120. Each side wall 90 transitions via an arcuate end wall 124 to a projection 128. The projections 128 partially define receiving cavities 136 with the planar surface 74. As best shown in FIG. 3, the projections 128 and arcuate end walls 124 are also offset from the housing surface 120 and present depressed surfaces 140 substantially flush with the surface 98. Catches 144, in the form of angled lateral recesses, are laterally positioned near the opening 60.

Referring again to FIGS. 1 and 2, the battery pack 14 is a rechargeable battery typically used with portable power tools (e.g., a portable electric drill) and includes a plate 170 separating a connecting portion 174 containing a battery coupling structure 178 from a cell portion 182 containing the battery cells. The battery can be a lithium-ion battery with a DC voltage output range from approximately 18 to 28 volts with 3.0-5.0 amp-hours of run time. As an example of the type of battery that can be used with this system, the battery pack 14 may be a Milwaukee M18™ REDLITHIUM™ compact battery such as a M18™ REDLITHIUM™ XC 4.0 18 volt lithium-ion battery. In other embodiments, other rechargeable power tool battery packs may be suitable to provide the required power for the application.

The cell portion 182 is best illustrated in FIG. 1 by means of phantom lines to account for differing battery brands or types. For illustrative purposes, the remaining figures of the battery pack 14 only display the connecting portion 174.

Figure 5:
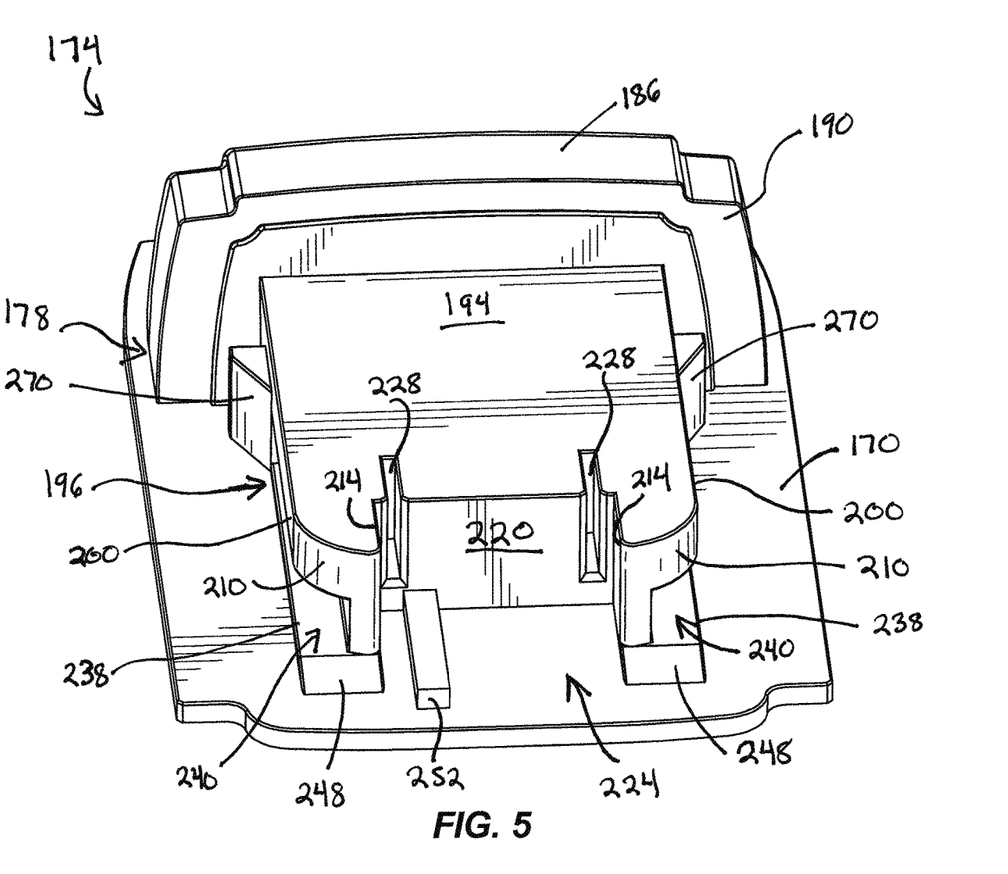
FIG. 5 is a perspective view of the battery pack illustrated in FIG. 2.

With reference to FIGS. 2 and 5, the battery coupling structure 178 includes an end portion 186 housing a release mechanism. Two side release levers (not shown) laterally extend from the end portion 186 and are coupled to the release mechanism. In other embodiments with other battery packs, the release mechanism may be differently positioned. A travel stop 190 integral with the end portion 186 adjoins a top surface 194 of a mating block 196. The mating block 196 extends across a substantial portion of the plate 170 and features first and second shoulders 200, each configured with a curved external surface 210 and a generally flat internal surface 214. The internal surfaces 214, together with a contact face 220 and the plate 170 serve to define a receiving pocket 224. Receptacles 228 are positioned into the face 220 and are electrically connected to the battery cells within the cell portion 182. Steps 238 on the plate 170 and the shoulders 200 together form opposing side receiving cavities 240. At one end of each cavity 240 ramps 248 smoothly connect the plate 170 and the steps 238. An inner guide 252 is further positioned between the surfaces 214 on the plate 170. Near the travel stop 190, spring loaded angled locking wedges 270 are biased outward and away from the block 196.

Figure 6:
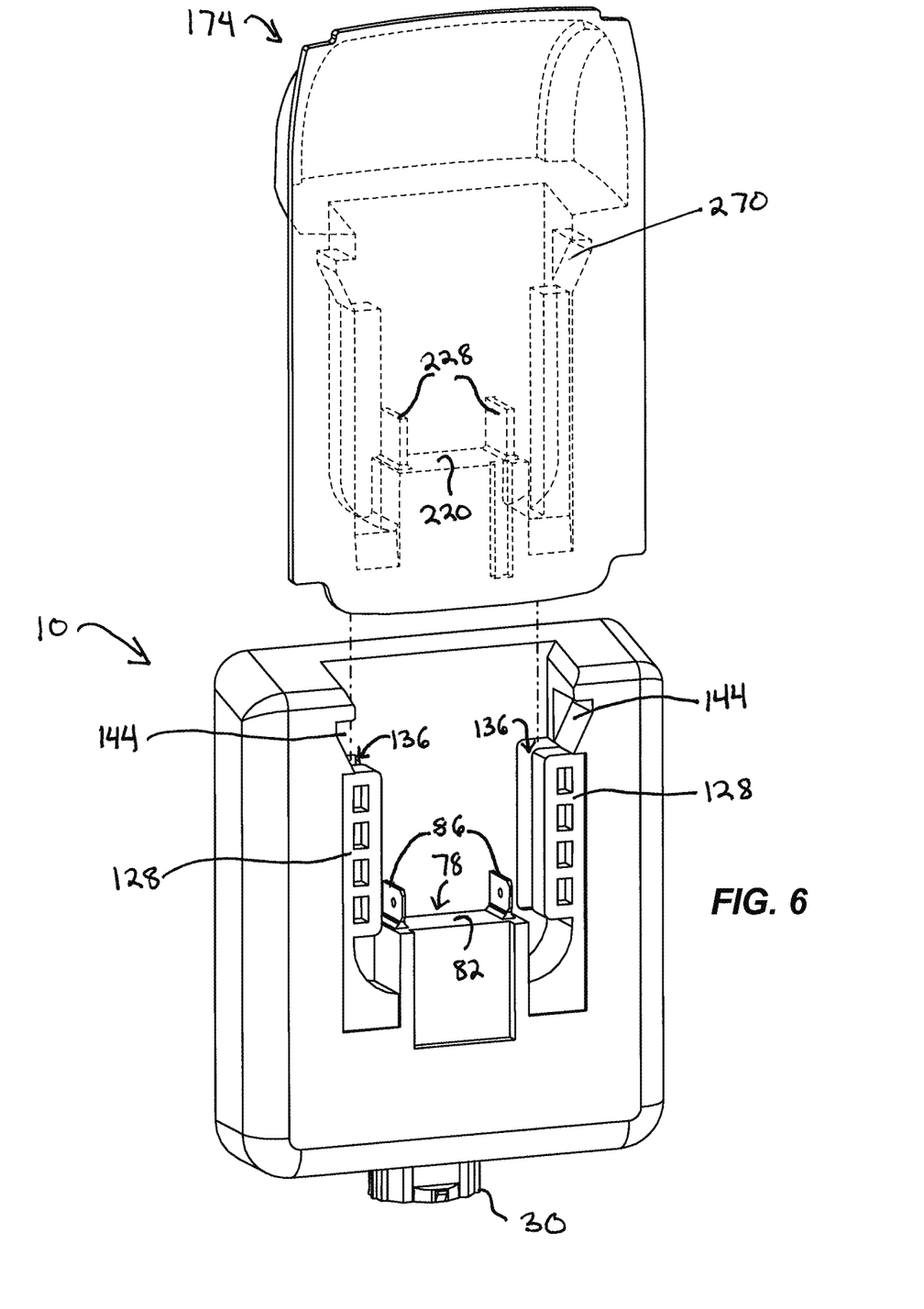
FIG. 6 is another perspective view of the ignition controller and battery pack illustrated in FIG. 2.

To assemble the battery pack 14 to the ignition controller 10, a user guides connecting portion 174 of the battery pack 14 so that the mating block 196 is aligned with the opening 60. FIG. 6 illustrates the path that the battery pack 14 follows in order to mate with the controller 10. After the mating block 196 is initially received in the recess 70, the user continues to slide battery pack 14 into engagement with the ignition controller 10. The ramps 248 of the battery pack 14 contact the projections 128 of the ignition controller 10 and direct the projections 128 into the side receiving cavities 240 of the battery pack 14. Concurrently, the shoulders 200 of the battery pack 14 enter the receiving cavities 136 of the ignition controller 10. Continued sliding of the battery pack 14 engages the inner guide 252 with the surface 98 of the connector block 78. The electrical prongs 86 mate with the receptacles 228 to electrically couple the ignition controller 10 with the battery pack 14 as the curved portions 210 of the shoulders 200 contact the arcuate walls 124 of the ignition controller 10 and the face 220 of the battery pack 14 abuts the contact surface 82. The angled locking wedges 270, which are initially depressed into the block 196, release into the catches 144 upon full engagement of the controller 10 and the battery pack 14. The travel stop 190, along with one or more of the previously described surfaces of both components, precludes further approach by the battery pack 14.

When the battery pack 14 is fully received by the ignition controller 10, contact between the angled locking wedges 270 and the catches 144, as well as between the projections 128 and the shoulders 200, securely holds the battery pack 14 and the ignition controller 10 together and hinders any movement tending to separate the two.

In operation, once the ignition controller 10 and the battery pack 14 are properly coupled, power from the battery pack 14 is now transferrable through the circuit board 22 and to the connector 30. Either before or after coupling of the controller 10 to the battery pack 14, an exothermic welding igniter (not shown) is coupled to the connector 30. The igniter includes an igniter tip with a filament and a pair of electrical conductors. Conducting or lead wires (not shown) are secured at one end to the electrical conductors and at the other end to the connector 30. With the controller 10 now electrically coupled to the igniter, a user simultaneously depresses the pushbuttons 42, the movement of which activates the switch on the circuit board 22 to complete the electrical circuit. Completion of the circuit activates the LED indicator 38, and power flows from the battery pack 14 to the connector 30 and through the lead wires to the igniter. The current discharged heats the filament and drives the exothermic welding process as previously described. If only a single pushbutton 42 is depressed, the circuit remains open and the LED indicator 38 will not light. In other embodiments, the LED indicator 38 can be configured to light when the battery pack 14 is coupled to the housing 18 or when a device is coupled to the connector 30.

After the exothermic welding is completed, the igniter is disconnected from the connector 30, and the battery pack 14 is removed from the ignition controller 10. To remove the battery pack 14 from the ignition controller 10, the user depresses the two side release levers of the battery pack 14. The angled locking wedges 270 recede into the mating block 196, permitting the user to slide the mating block 196 out of the recess 70 and the battery pack 14 away from the controller 10, whereby the battery pack 14 is available for other uses.

The controller 10 provides, among other things, a portable ignition welding apparatus that mates with a readily available portable rechargeable battery used with portable power tools to supply suitable power for heating an exothermic welding igniter. The ignition controller 10 is not limited in its use to exothermic welding, but can be used as a power controller for a variety of applications. Various features and advantages of the invention are set forth in the following claims.

What is claimed is:

1. A portable exothermic welding ignition controller for use with a portable power tool battery, the portable exothermic welding ignition controller comprising:
    a housing portion;
    a circuit board positioned within the housing portion;
    a battery receiving portion directly associated with the housing portion, the battery receiving portion including
        a recess open on two sides of the battery receiving portion and partially defined by a pair of spaced-apart opposed sidewalls, the recess configured to receive a first portion of the portable power tool battery with a second portion of the portable power tool battery disposed outside of the recess,
        a contact surface disposed in the recess, the contact surface spaced apart by a gap from each of the pair of spaced-apart opposed sidewalls,
        a pair of electrical prongs disposed in the recess adjacent the contact surface, the pair of electrical prongs configured to electrically couple the circuit board to the portable power tool battery, each of the electrical prongs of the pair of electrical prongs extending in a direction away from and perpendicular to a plane defined by the contact surface, and
        projections disposed in the recess, the projections at least partially defining receiving cavities with each of the projections at least partially defining a respective one of the receiving cavities in the recess, each of the receiving cavities configured to slidably receive at least a portion of a corresponding shoulder of the portable power tool battery;
    a connector electrically coupled to the circuit board, wherein the connector is configured to electrically couple conducting lead wires for an exothermic welding igniter; and
    an actuator operatively coupled with the circuit board to cause the discharge of electrical power from the portable power tool battery through the connector to the exothermic welding igniter, the actuator configured to move in an actuation direction perpendicular to the plane defined by the contact surface.

2. The portable exothermic welding ignition controller of claim 1, wherein the contact surface is configured to act as a stop for the portable power tool battery.

3. The portable exothermic welding ignition controller of claim 1, wherein the contact surface is positioned opposite a first open side of the recess and is perpendicular to a second plane defined by a second open side of the recess.

4. The portable exothermic welding ignition controller of claim 3, wherein each of the electrical prongs of the pair of electrical prongs extends in the direction away from the contact surface toward the first open side of the recess.

5. The portable exothermic welding ignition controller of claim 4, wherein
    the battery receiving portion further includes a planar surface at least partially bounding the recess, and
    each of the electrical prongs of the pair of electrical prongs extends in another direction away from the planar surface.

6. The portable exothermic welding ignition controller of claim 5, wherein each of the electrical prongs of the pair of electrical prongs is perpendicular to the planar surface.

7. The portable exothermic welding ignition controller of claim 1, wherein the battery receiving portion further includes a planar surface, the planar surface and the pair of spaced-apart opposed sidewalls at least partially bounding the recess.

8. The portable exothermic welding ignition controller of claim 7, wherein each of the projections extends in a direction away from one of the pair of spaced-apart opposed sidewalls into the recess.

9. The portable exothermic welding ignition controller of claim 7, wherein each of the pair of spaced-apart opposed sidewalls extends in a direction that is perpendicular to the plane defined by the contact surface.

10. The portable exothermic welding ignition controller of claim 7, wherein the planar surface includes a single continuous surface extending from the contact surface to one of the two sides of the battery receiving portion.

11. The portable exothermic welding ignition controller of claim 1, wherein the connector is coupled to the housing.

12. The portable exothermic welding ignition controller of claim 1, wherein the battery receiving portion is integrally formed with the housing portion as a unitary part.

13. The portable exothermic welding ignition controller of claim 1, wherein the two sides on which the recess is open are adjacent sides of the battery receiving portion.

14. The portable exothermic welding ignition controller of claim 1, wherein each of the receiving cavities is configured to slidably receive the portion of the corresponding shoulder of the portable power tool battery such that the portable power tool battery moves linearly toward the contact surface for insertion of the first portion of the portable power tool battery into the recess.

15. The portable exothermic welding ignition controller of claim 1, wherein each of the receiving cavities extends linearly in a direction that is perpendicular to the plane defined by the contact surface.

16. The portable exothermic welding ignition controller of claim 1, wherein each of the electrical prongs of the pair of electrical prongs includes a rectangular portion.

17. The portable exothermic welding ignition controller of claim 1, wherein
    the housing portion includes an external housing surface and a pair of opposed lateral external sides,
    at least one of the external housing surface and the battery receiving portion is configured to rest on the portable power tool battery such that the portable exothermic welding ignition controller is configured to be supported by the portable power tool battery, and
    each lateral external side extends in a direction perpendicular to the plane defined by the contact surface.

18. A portable exothermic welding ignition controller for use with a portable power tool battery, the portable exothermic welding ignition controller comprising:
    a housing portion;
    a circuit board positioned within the housing portion;
    a battery receiving portion associated with the housing portion, the battery receiving portion including
        a recess defined in the battery receiving portion, the recess configured to receive a first portion of the portable power tool battery with a second portion of the portable power tool battery disposed outside of the recess, wherein the recess defines a first opening and a second opening, wherein the first opening defines a first plane and the second opening defines a second plane that is at an acute angle relative to the first plane, and a pair of spaced-apart electrical prongs disposed in the recess, the pair of electrical prongs configured to electrically couple the circuit board to the portable power tool battery; and an actuator operatively coupled with the circuit board, the actuator configured to cause the portable power tool battery to discharge power to an exothermic welding igniter, and wherein the portable exothermic welding ignition controller is configured such that when the recess receives the first portion of the portable power tool battery, a portion of the battery receiving portion external to the recess contacts and overlaps a portion of the second portion of the portable power tool battery.

19. The portable exothermic welding ignition controller of claim 18, further comprising a connector electrically coupled to the circuit board, wherein the connector is configured to electrically couple to a pair of conducting lead wires of the exothermic welding igniter.

20. The portable exothermic welding ignition controller of claim 19, wherein the connector is configured to connect to the pair of conducting lead wires with a male/female connection.

21. The portable exothermic welding ignition controller of claim 20, wherein the connector extends away from a side of the portable exothermic welding ignition controller in a direction that is parallel to the second plane.

22. The portable exothermic welding ignition controller of claim 18, wherein the battery receiving portion further includes a planar surface, a contact surface, and two opposed sidewalls at least partially bounding the recess, and projections disposed in the recess, each of the projections partially defining a respective one of a plurality of receiving cavities in the recess, each receiving cavity of the plurality of receiving cavities configured to slidably receive at least a portion of a corresponding shoulder of the portable power tool battery such that the portable power tool battery moves linearly in a direction that is parallel to the second plane and toward the contact surface for insertion of the first portion of the portable power tool battery into the recess.

23. The portable exothermic welding ignition controller of claim 22, wherein each of the pair of electrical prongs includes a rectangular face that extends in both a direction parallel to the second plane and a direction perpendicular to the second plane.

24. The portable exothermic welding ignition controller of claim 23, wherein the planar surface extends in a direction parallel to the second plane.

25. The portable exothermic welding ignition controller of claim 24, wherein each of the two opposed sidewalls extends in both a direction parallel to the second plane and a direction perpendicular to the second plane.

26. The portable exothermic welding ignition controller of claim 25, wherein the contact surface extends perpendicularly away from the planar surface.

27. The portable exothermic welding ignition controller of claim 26, further comprising a connector electrically coupled to the circuit board, wherein the connector is configured to electrically couple a pair of conducting lead wires of the exothermic welding igniter, and wherein the connector and the actuator are both located on a common side of the portable exothermic welding ignition controller.

28. The portable exothermic welding ignition controller of claim 22, wherein the planar surface includes a single continuous surface.

29. The portable exothermic welding ignition controller of claim 18, wherein the first portion includes a connection portion of the battery, and the second portion includes an entirety of a cell portion of the battery disposed outside of the portable exothermic welding ignition controller.

30. The portable exothermic welding ignition controller of claim 18, wherein the battery receiving portion is integrally formed with the housing portion as a unitary part.

31. The portable exothermic welding ignition controller of claim 18, wherein the actuator extends outwardly from the housing portion in a direction parallel to the second plane.

32. The portable exothermic welding ignition controller of claim 18, wherein the housing portion includes an external housing surface and a pair of opposed lateral external sides, at least one of the external housing surface and the battery receiving portion is configured to rest on the portable power tool battery such that the portable exothermic welding ignition controller is configured to be supported by the portable power tool battery, and each lateral external side extends in a direction perpendicular to the second plane.

33. A portable exothermic welding ignition controller for use with a portable power tool battery, the portable exothermic welding ignition controller comprising:

a housing portion having an external housing surface;

a circuit board positioned within the housing portion;

a battery receiving portion associated with the housing portion, the battery receiving portion including a recess open on two adjacent sides of the battery receiving portion, the recess configured to receive a connection portion of the portable power tool battery with a cell portion of the portable power tool battery disposed entirely outside of the recess, a planar surface and two opposed sidewalls at least partially bounding the recess, a contact surface disposed in the recess, wherein the contact surface has a maximum height extending in a direction away from the planar surface a first distance, a pair of electrical prongs disposed in the recess, the pair of electrical prongs configured to electrically couple the circuit board to the portable power tool battery, wherein each electrical prong of the pair of electrical prongs is perpendicular to the contact surface and the planar surface and has a maximum prong height extending in the direction away from the planar surface a second distance, wherein the first distance is greater than the second distance, and projections disposed in the recess, each of the projections partially defining a respective one of a plurality of receiving cavities in the recess, each receiving cavity of the plurality of receiving cavities configured to slidably receive at least a portion of a corresponding shoulder of the portable power tool battery such that the portable power tool battery moves linearly toward the contact surface for insertion of the connection portion of the portable power tool battery into the recess;

a connector electrically coupled to the circuit board, wherein the connector is configured to receive an end of a pair of conducting lead wires to selectively electrically couple the pair of conducting lead wires to the portable power tool battery;

an actuator operatively coupled with the circuit board, the actuator and the circuit board configured to cause the portable power tool battery to discharge power through the connector to the exothermic welding igniter; and wherein at least one of the external housing surface and the battery receiving portion is configured to rest on the portable power tool battery such that the portable exothermic welding ignition controller is configured to be supported by the portable power tool battery.

34. The portable exothermic welding ignition controller of claim 33, wherein the battery receiving portion is integrally formed with the housing portion as a unitary part.

35. The portable exothermic welding ignition controller of claim 33, wherein the planar surface includes a single continuous surface extending from the contact surface to one of the two adjacent sides.

36. The portable exothermic welding ignition controller of claim 33, wherein the housing portion further includes a pair of opposed lateral external sides, each lateral external side extending in a direction perpendicular to the contact surface.

* * * * *